United States Patent [19]
Baumle

[11] 3,940,155
[45] Feb. 24, 1976

[54] ELASTOMERIC SEAL
[75] Inventor: Rudolf F. Baumle, Mount Prospect, Ill.
[73] Assignee: Borg-Warner Corporation, Chicago, Ill.
[22] Filed: Sept. 20, 1974
[21] Appl. No.: 507,827

[52] U.S. Cl............................ 277/183; 277/207 A
[51] Int. Cl.².................... F16J 15/18; F16J 15/32
[58] Field of Search..... 277/183, 184, 205, 207–213

[56] References Cited
UNITED STATES PATENTS
| | | | |
|---|---|---|---|
| 3,173,699 | 3/1965 | Nathan | 277/209 |
| 3,394,939 | 7/1968 | Mastro | 277/183 |

*Primary Examiner*—Robert I. Smith
*Attorney, Agent, or Firm*—James A. Geppert

[57] ABSTRACT

A shaft seal for a slowly rotating shaft operating in a high pressure environment where the seal is formed of an elastomeric material providing annular rings and grooves on the internal diameter thereof adapted to engage the rotating shaft and a generally cylindrical exterior surface to engage a metal cup and/or the housing for the shaft. The end of the seal exposed to high pressure has an annular groove therein to form inner and outer annular lips which sealingly engage the shaft and the housing, respectively.

5 Claims, 4 Drawing Figures

ELASTOMERIC SEAL

BACKGROUND AND SUMMARY OF THE INVENTION

The present invention relates to an elastomeric shaft seal and more particularly to a high pressure, low speed, bi-directional elastomeric seal for sealing high pressure conditions on a slowly rotating shaft.

Elastomeric seals of various configurations have been utilized to provide a seal between a rotating shaft and a housing where a pressurized fluid environment is located on one side of the seal and a second fluid is located on the opposite side thereof. In most instances, a lip-type seal is utilized; especially in a high pressure situation such as for a sector seal for the gear shaft of an automobile power steering unit. In many cases of such a high pressure environment, a stack of two or more lip seal members and reinforcing spacers is necessary.

Problems occur in the stacked lip seal arrangements in the simple operation of assembling the seals onto the shaft; for example, the seals may be positioned in the wrong direction or two seals assembled in opposite directions, thus decreasing the efficiency of the seal. Also, when pressure is applied to a lip seal, the pressure acts directly on the lip and forces the lip tight against the shaft. When the pressure is great enough, the seal lip will be deformed and stretched so as to force a greater portion of the lip surface area tightly around the shaft. The torque required to turn the shaft under this high pressure condition becomes excessive and, correspondingly, lip wear increases and rupture of the "flex section" becomes a distinct possibility. The present invention obviates the above described problems.

Among the objects of the present invention is the provision of a resilient seal in the form of a unitary elastomeric plug for the sealing of high pressures exerted thereon where the seal engages a housing bore and a rotating shaft extending therethrough. This seal will replace one or more conventional type lip seals stacked together and thus reduce assembly time and possible assembly errors. Also, the seal will operate with considerably less torque than lip seals used in high pressure applications.

Another object of the present invention is the provision of a resilient seal where the torque exerted by the seal upon increasing pressure acting on one end of the seal is held at a minimum. The seal has an interference fit with the shaft to effect an initial and static seal. One end of the seal either abuts a shoulder or flange formed on the housing or is retained in a metal shell or cup member positioned in the housing, while the opposite end of the seal is provided with an annular groove forming the seal end surface into a pair of concentric lips or rings; one of which engages the housing bore and the other one engages the shaft. As the pressure increases, the annular rings tend to separate in opposite radial directions to effect a tighter seal.

A further object of the present invention is the provision of a resilient seal which will be lubricated by the pressurized fluid to reduce the torque required to rotate the shaft engaged by the seal. The internal diameter of the seal has a sealing surface with alternating annular rings and concave recesses. When the pressure acts on the one end of the seal, the pressure operates in an axial direction to squeeze the seal body axially and compress the body within the limited space between the shaft and the bore without appreciably increasing the torque required to turn the shaft. Fluctuation of pressure against the seal will cause the annular rings to move slightly in the axial direction, which will result in a wiping and distributing action for a thin film of the pressurizing fluid at the interface between the annular rings and the shaft; thus lubricating this interface and further reducing the turning torque requirement of the shaft.

Further objects are to provide a construction of maximum simplicity, efficiency, economy and ease of assembly and operation, and such further objects, advantages and capabilities as will later more fully appear and are inherently possessed thereby.

DESCRIPTION OF THE PREFERRED EMBODIMENTS

Figure 1:
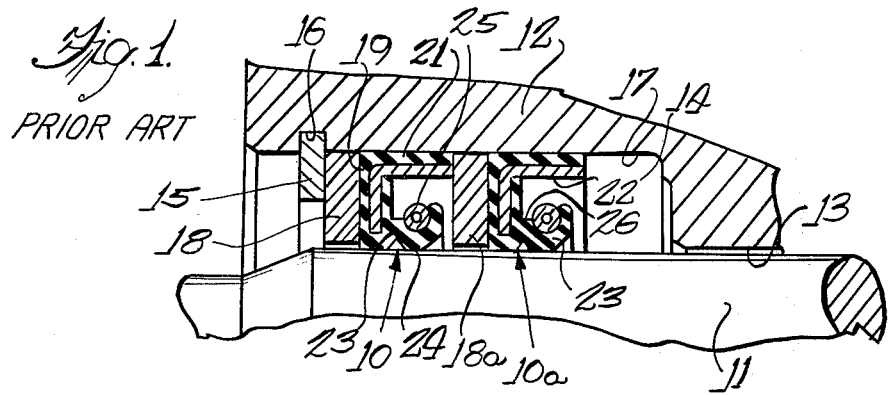
FIG. 1 is a partial cross sectional view through a standard sealing arrangement using lip seals for a shaft shown in elevation.

Referring more particularly to the disclosure in the drawing wherein are shown illustrative embodiments of the present invention, FIG. 1 discloses a conventional sealing method for a high pressure environment utilizing a stack of two or more lip seals 10, 10a and their reinforcing spacers 18, 18a for sealing engagement between a rotating shaft 11 and a housing 12 having a bore 13 through which the shaft extends. The housing has an enlarged recess 14 communicating with the bore 13 and housing the lip seals 10, 10a, and a snap ring 15 is mounted in an annular groove 16 in the generally cylindrical wall 17 of the recess to prevent axial movement of the lip seals under the high pressure present in the bore 13.

The sealing arrangement includes an annular reinforcing spacer or washer 18, a first lip seal 10, a second annular spacer or washer 18a and a second lip seal 10a. Each lip seal includes an L-shaped body 19 with a cylindrical portion 21 frictionally engaging the wall 17, and an L-shaped reinforcing metal ring 22 at least partially embedded in the body 19. A sealing lip 23, having one or more sealing rings or surfaces 24, extends generally axially from the body 19 toward the high pressure side; and an annular spring 25 is positioned in a groove formed in the outer surface 26 of the lip to aid in urging the lip into frictional engagement with the shaft.

When pressure is applied to the lip seals 10, 10a, the pressure acts directly on the lip 23, and especially against the surface 26, and forces the lip tight against the shaft 11. When the pressure increases, the seal lip 23 will be deformed and stretched so as to force a greater portion of the lip surface area 24 tightly around the shaft. Thus, the torque required to turn the shaft 11 becomes excessive and decreases the efficiency of the shaft motive force. Also, lip wear will increase and the flexible portion of the seal may rupture.

Figure 2:
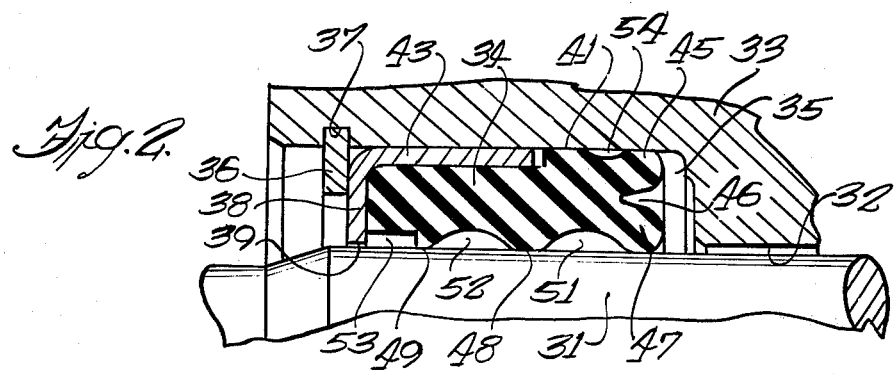
FIG. 2 is a partial cross sectional view through the improved sealing arrangement of the present invention.
Figure 3:
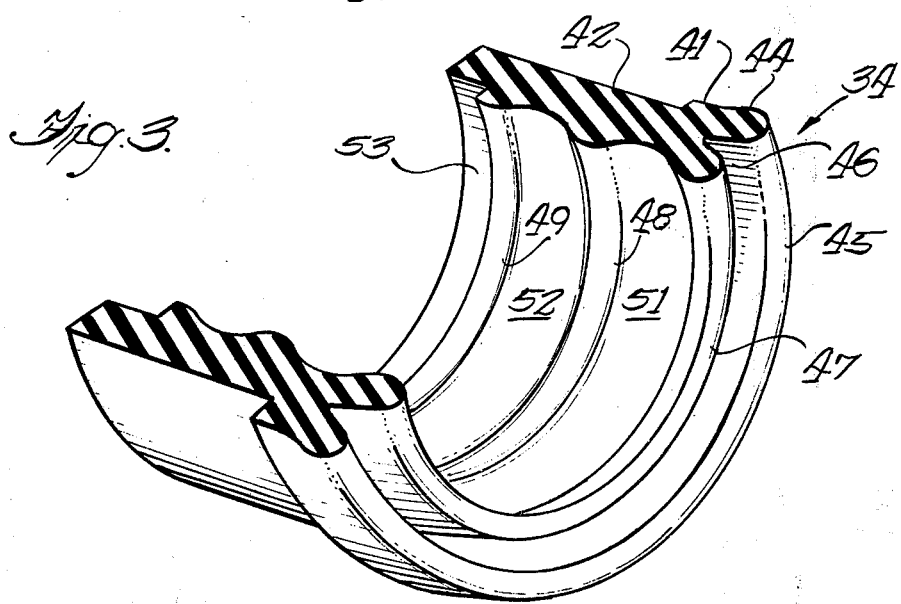
FIG. 3 is an enlarged perspective view, partially cut away, of the resilient seal.

Now considering FIGS. 2 and 3, the shaft 31 extends through a bore 32 in a housing 33, and a resilient seal 34 formed of a suitable elastomeric material, such as rubber, is positioned in a recess 35 in the housing. A snap ring 36 acting as a movement limiting or stop means is received in an annular groove 37 in the housing to retain the seal in position in the recess. A metal shell or cup 38 is located in the recess 35 to abut the snap ring 36, and the diameter of the opening 39 through the cup receiving the shaft 31 has a minimum shaft clearance for the purpose to be later described.

As seen in FIG. 3, the resilient seal 34 includes a generally cylindrical outer surface 41 with a reduced diameter portion 42 therein to receive the side wall 43 of the cup 38. At the end of the seal opposite the cup, the outer wall terminates in an enlarged rounded edge 44, and a generally V-shaped annular groove 46 forms an outer annular lip 45 at the edge 44 and a concentric annular inner lip or ring 47 radially inwardly of the groove.

Along with the rounded inner lip or ring 47, the seal has a pair of axially spaced annular rings 48 and 49 having rounded lobes; the rings 47, 48 and 49 being separated by a pair of concave recesses 51 and 52. Forwardly of the ring 49, an annular recess 53 is formed in the internal diameter of the seal; which recess 53 acts to prevent the elastomeric material of the seal from being extruded axially, when under high pressure, through the clearance between the cup opening 39 and the shaft 31. The clearance is minimized to aid in preventing the possibility of the elastomer extruding along the shaft; the extruded elastomer tending to bind up the shaft and prevent rotation thereof.

The seal 34, as shown in FIG. 3, is inserted into the metal cup 38 with the recess 42 receiving the cup side wall 43 to provide a friction fit, and the cup and seal are positioned on the shaft 31 to the left of the housing 33, as seen in FIG. 2, and inserted into the recess 35. Then the snap ring 36 is positioned in the groove 37 to retain the seal in the recess, and pressure in the bore 32 will cause the seal and cup to abut the snap ring 36. As the rounded outer edge 44 of the seal body has a diameter greater than that of the cylindrical surface 41, insertion of the seal into the recess will compress the rounded edge 44 and may result in a shallow concave recess 54 being formed in the surface 41.

The inner and outer annular lips 45 and 47 provide an interference fit in the recess 35 and on the shaft 31, respectively under static conditions. High pressure exerted on the seal 34 through the bore 32 acts on the inner and outer annular lips 45 and 47, respectively, to force the lips outwardly and inwardly in a radial direction to effect a tighter seal. The pressure also acts in an axial direction tending to squeeze the elastomeric seal 34 axially, wherein the axial displacement of the captive seal forces the elastomer to displace radially against the wall of the recess 35 and the shaft 31 effecting a tighter seal. The large exterior surface area of the seal is forced tightly against the shell 38 and recess wall, while the minimum surface area of the annular rings 47, 48 and 49 are displaced radially against the shaft. However, the surface sealing area of the annular rings in contact with the shaft does not increase appreciable while the sealing force in the radial direction does increase with pressure. Thus, the torque required to turn the shaft under high pressure conditions is kept to a minimum.

Tests were made utilizing the seal 34 of the present invention compared to a conventional lip seal arrangement, such as shown in FIG. 1. Over a pressure range of 0 to 2000 psi, the torque required to rotate a shaft increased from a minimum value of 25 inch-pounds to a maximum value of approximately 325 inch-pounds at 2000 psi with the conventional arrangement. Over the same pressure range, the torque required to rotate a shaft contacted by the present seal showed a minimum value of 10 inch-pounds and a maximum value of approximately 50 inch-pounds at a pressure of 2000 psi. Thus, the torque gradually increases upon a pressure increase exerted on the seal and the maximum torque is considerably lower than that resulting from a conventional lip seal arrangement.

Fluctuation of the pressure against the seal 34 will cause the seal body to move slightly in the axial direction and, correspondingly, the annular sealing rings 47, 48 and 49 engaging the shaft will also move slightly in the axial direction. The axial movement of these annular rings will wipe and distribute a very thin film of the pressurizing fluid at the interface between the sealing rings and the shaft, lubricating this interface and further reducing the turning torque requirement of the shaft. Under testing, the first concave recess 51 showed the presence of the pressurizing fluid while the second recess 52 was substantially free of this fluid.

Figure 4:
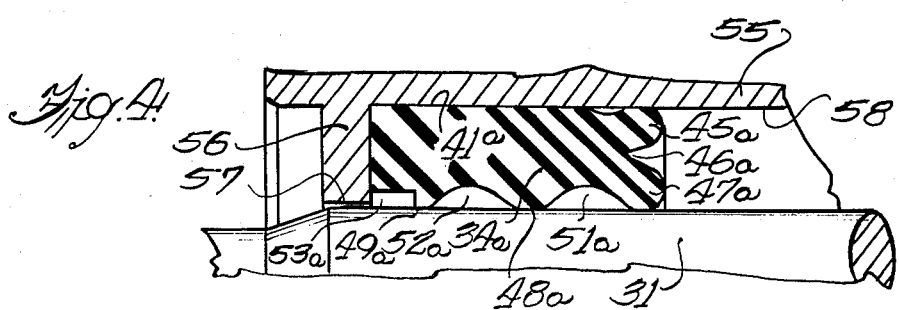
FIG. 4 is a partial cross sectional view, similar to FIG. 2, of an alternate construction of the seal assembly.

FIG. 4 discloses an alternate embodiment of seal 34a utilized in a housing 55 for the shaft 31, wherein the housing has a radially inwardly extending flange 56 providing an opening 57 having a slight clearance with the shaft. The housing has a bore 58 receiving the seal 34a, and the flange 56 eliminates the necessity of the metal cup or shell shown in FIG. 2. The seal 34a has a cylindrical outer wall 41a in a friction fit with the bore 58 of the housing; the wall 41a terminating at the open end of the bore in an outer annular sealing lip 45a. A concentric inner annular sealing lip or ring 47a is separated from the outer lip 45a by the annular groove 46a, and additional annular rings 48a and 49a are axially spaced from the ring 47a by the concave recesses 51a and 52a. Also, the seal has an inner annular relief area 53a adjacent the flange 56. This seal operates in the same manner as the embodiment of FIG. 2.

This seal may find particular use as a sector seal in an automobile power steering assembly where high pressures are generated to provide the power assist, but the shaft rotates at a relatively slow speed. However, this seal is contemplated for use in other sealing arrangements and it is not my desire to unnecessarily limit the scope or utility of the present invention by this illustrative use thereof.

I claim:

1. In combination, a seal and a rotatable shaft of predetermined diameter located within a housing, said seal comprising a ring of imperforate elastomeric material having a generally cylindrical inner surface engaging the shaft and a generally cylindrical outer surface frictionally engaging the interior surface of the housing, means in said housing limiting axial movement of said seal, said seal ring having one end abutting said movement limiting means and an opposite free end provided with a pair of concentric annular inner and outer lips separated by an annular generally V-shaped groove defining the lips, said groove and lips being exposed to pressure in said housing causing inward and outward movement of said lips in a generally radial direction to engage said shaft and housing, respectively, axially spaced annular rings on the cylindrical inner surface engaging the shaft and separated by a pair of concave recesses, said annular rings and annular lips all having rounded surfaces in contact with said shaft and housing, and one end of said seal having a cut-away counterbore on the cylindrical inner surface adjacent said movement limiting means to prevent extrusion of said elastomeric material between said movement limiting means and said shaft.

2. In the combination set forth in claim 1, wherein an annular concave recess is formed in the outer cylindrical surface adjacent the outer annular lip.

3. In the combination as set forth in claim 2, wherein said V-shaped groove extends inward from the free end to terminate at a point generally radially aligned between the concave recess in the outer cylindrical surface and the concave recess in the inner cylindrical surface adjacent to the inner annular lip.

4. In the combination as set forth in claim 1, wherein said movement limiting means comprises a radially inwardly extending stop integral with said housing and terminating in a cylindrical surface closely adjacent to the surface of said shaft.

5. In the combination as set forth in claim 1, wherein said movement limiting means comprises a radially inwardly extending stop in said housing, a metal shell having a cylindrical wall and a radially inwardly extending flange adapted to abut said stop, the cylindrical outer surface of the seal having a reduced diameter portion receiving the cylindrical shell wall in a friction fit.

* * * * *